(12) United States Patent
Khourshid et al.

(10) Patent No.: US 10,113,084 B2
(45) Date of Patent: Oct. 30, 2018

(54) MOLD RELEASE AGENT

(71) Applicant: Illinois Tool Works, Inc., Glenview, IL (US)

(72) Inventors: Tysir Khourshid, Glenview, IL (US); Douglas E. Moon, Glenview, IL (US)

(73) Assignee: Illinois Tool Works, Inc., Glenview, IL (US)

( * ) Notice: Subject to any disclaimer, the term of this patent is extended or adjusted under 35 U.S.C. 154(b) by 503 days.

(21) Appl. No.: 14/686,318

(22) Filed: Apr. 14, 2015

(65) Prior Publication Data

US 2015/0337172 A1   Nov. 26, 2015

Related U.S. Application Data

(60) Provisional application No. 62/001,891, filed on May 22, 2014.

(51) Int. Cl.
| | | |
|---|---|---|
| *C09D 183/06* | (2006.01) | |
| *C08K 5/00* | (2006.01) | |
| *B29C 63/48* | (2006.01) | |
| *B29C 33/64* | (2006.01) | |
| *C08K 3/01* | (2018.01) | |
| *B29K 83/00* | (2006.01) | |
| *B29L 9/00* | (2006.01) | |
| *B29D 30/06* | (2006.01) | |

(52) U.S. Cl.
CPC ............ *C09D 183/06* (2013.01); *B29C 33/64* (2013.01); *B29C 63/48* (2013.01); *C08K 3/01* (2018.01); *C08K 5/0008* (2013.01); *B29D 2030/0655* (2013.01); *B29K 2083/00* (2013.01); *B29L 2009/005* (2013.01)

(58) Field of Classification Search
None
See application file for complete search history.

(56) References Cited

U.S. PATENT DOCUMENTS

| | | | | |
|---|---|---|---|---|
| 4,277,382 A | * | 7/1981 | Lin .......................... | C03C 25/40 428/378 |
| 4,359,340 A | | 11/1982 | Comper et al. | |
| 4,431,452 A | | 2/1984 | Comper et al. | |
| 4,509,984 A | | 4/1985 | Scheiderich et al. | |
| 4,533,305 A | | 8/1985 | Comper et al. | |
| 4,636,407 A | | 1/1987 | Comper et al. | |
| 4,666,518 A | | 5/1987 | Hallenbeck et al. | |
| 4,780,225 A | | 10/1988 | Mowdood et al. | |
| 4,895,964 A | * | 1/1990 | Margida ................ | C08G 77/388 556/423 |
| 5,073,588 A | * | 12/1991 | Seltmann ................ | B29C 33/64 264/331.11 |
| 5,073,608 A | | 12/1991 | Ona et al. | |
| 5,152,950 A | | 10/1992 | Ona et al. | |
| 5,244,598 A | * | 9/1993 | Merrifield ............... | A61K 8/062 106/287.11 |
| 5,346,951 A | * | 9/1994 | Suwada ................ | C08G 77/442 525/64 |
| 5,385,459 A | * | 1/1995 | Graves .................. | B29C 33/505 264/315 |
| 5,431,832 A | * | 7/1995 | Crowe ................. | C10M 107/50 106/38.22 |
| 5,719,234 A | * | 2/1998 | Yabuta .................... | B05D 7/532 427/407.1 |
| 6,022,050 A | * | 2/2000 | Kline .................... | C08K 5/0025 283/81 |
| 6,998,088 B2 | | 2/2006 | Beers et al. | |
| 7,439,211 B2 | * | 10/2008 | Guichard ................ | B29C 33/64 106/38.22 |
| 7,705,086 B2 | * | 4/2010 | Lu .......................... | B28B 7/384 516/53 |
| 8,101,279 B2 | * | 1/2012 | Guichard ................ | B29C 33/64 428/447 |
| 8,507,418 B2 | | 8/2013 | Breunig | |
| 2003/0114321 A1 | * | 6/2003 | Giraud .................... | B29C 33/64 508/204 |
| 2006/0025517 A1 | | 2/2006 | Guichard et al. | |
| 2006/0162888 A1 | * | 7/2006 | Sekiya ...................... | D21F 1/30 162/199 |
| 2006/0198021 A1 | * | 9/2006 | Fukuda ..................... | G02B 1/11 359/487.05 |
| 2009/0068911 A1 | * | 3/2009 | Hupfield ................. | C08G 77/26 442/327 |
| 2009/0114327 A1 | * | 5/2009 | Breunig .................. | B29C 33/64 152/450 |
| 2014/0058012 A1 | * | 2/2014 | McCormack ........ | C09D 183/06 523/425 |

FOREIGN PATENT DOCUMENTS

| | | |
|---|---|---|
| CN | 1256995 A | 6/2000 |
| EP | 0279372 A2 | 8/1988 |
| EP | 0206314 B1 | 3/1990 |
| EP | 1964891 A1 | 9/2008 |
| WO | 2011072110 A1 | 6/2011 |

* cited by examiner

*Primary Examiner* — Robert S Loewe
(74) *Attorney, Agent, or Firm* — Avery N. Goldstein; Blue Filament Law, PLLC

(57) ABSTRACT

A mold release composition is provided contains a minimum of three reactive moieties per molecule to provide for both mold adhesion and crosslink density. The composition is soluble in a VOC-free organic solvent or water, alone or with resort to an emulsifier. The composition can be used as a semi-permanent mold release in some embodiments.

4 Claims, No Drawings

MOLD RELEASE AGENT

CROSS-REFERENCE TO RELATED APPLICATIONS

This application is a non-provisional application that claims priority benefit of U.S. Provisional Application Ser. No. 62/001,891, filed May 22, 2014, the contents of which are hereby incorporated by reference.

FIELD OF THE INVENTION

The present invention in general relates to a mold release agent, and in particular, to VOC-free release agents that exhibit properties that include at least one of shelf stability, cure characteristics, suitability over a wide variety of mold substrates, release ease for a variety of molding mediums, cycle longevity (number of demoldings between reapplication), suitability for neat (solvent free) usage, or water-based systems.

BACKGROUND OF THE INVENTION

The molding industry utilizes mold release agents for the removal of articles formed by a variety of molding mediums utilizing a variety of molds which are constructed utilizing a wide variety of materials. These mold release agents can be divided into several categories and are subdivided by their longevity (number of cycles between reapplication of the mold release agent.

Sacrificial release agents are one type of commonly used release agents. These release agents are general applied for each and every molding cycle. Sacrificial release agents exhibit little if any adhesion to the mold surface and release is provided by that failure with the release agent being removed from the mold surface and transferred or applied to the molded article. Sacrificial release agents further provide for excellent release ease of a molded article and accommodate to help keep mold surfaces clean preventing fouling and tarnish to the mold. However, the transfer of the sacrificial release agent to the molded article can deleteriously effect properties of the molded article such as adhesion between the article and a support apparatus (often referred to as an "insert") which allows for support and/or mounting of the molded article, paintability, acceptance of an adhesive, or other attribute as the molded article is "coated" with a release agent. Because sacrificial release agents are not adherent to the mold surface, they require reapplication to the mold surface for each and every molding cycle and thus exhibit "no longevity" and increased labor, materials use, and cycle time.

Semi-permanent release agents are another type of release agent which is typically used. Semi-permanent release agents are applied at a particular amount and at a particular frequency of intervals such that multiple molded articles are produced and demolded from a single application of the semi-permanent release agent. Semi-permanent release agents exhibit adhesion to the mold surface. Release ease is generally provided by the formation of an interface on the mold surface which is not compatible with the medium being molded against it. A well formulated semi-permanent release agent provides for excellent release ease, excellent longevity (number of molding cycle between re-application), excellent molded part appearance (often referred to as "Cosmetics"), a minimal amount of transfer so as to not interfere with bonding to an insert, application of a paint or an adhesive, or other "post molding application". However, transfer of the semi-permanent agent from the mold to the molded article can occur, causing similar deleterious effects as described for sacrificial release agents.

Finally, permanent release agents are another type of release agent typically used which is applied a single time and cured and remains on the mold surface until release efficacy is compromised whereupon they are removed and re-applied. Permanent release agents exhibit excellent adhesion to the mold surface. Release ease is provided by the adhesion of the permanent release agent to the mold, incompatibility with the medium being molded, and resistance to removal of the permanent release agent by the movement (action) of the mold medium against the agent (often referred to as "abrasion").

Release ease, longevity and tool longevity can be accentuated by use of sacrificial, semi-permanent, and combination of the two over the top of the permanent release agent. For example, permanent release agents can be used in conjunction with either a sacrificial or a semi-permanent release agent to aid in release, ease, longevity (time between application of the sacrificial or semi-permanent) and lifetime (time between initial application of the permanent release agent and removal thereof). There are myriads of possible combinations of material utilized to comprise sacrificial, semi-permanent and permanent release agents. Common release agents can be comprised of oils, fatty acids and their salts, 'waxes", silicon based polymers, fluoropolymers and co-polymers, glycols, and (with no intention of any limitation) combinations of any and all of the above.

Production of semi-permanent release agents which exhibit excellent adhesion to the mold surface, excellent release of the molding medium from the mold, excellent cosmetics, resistance to transfer at least without deleterious effect on post molding processes to the molded article, excellent longevity, and excellent economics for the molder elude the molding industry.

Besides the conventional molding process involving metal or other rigid molds, some rubber objects, notably vehicle tires, are produced by placing an uncured so-called "green" tire over an inflatable elastomeric bladder, with the metal outside (tread and sidewall) mold surrounding the green tire. The bladder is heated and inflated, and then expands to enlarge the green tire, pressing it into the outside metal mold. The hot, green tire is kept under pressure and heat from the bladder until the rubber is cured, at which point the bladder is deflated, the tire removed, and the next green tire placed in the mold over the bladder.

The mold releases used for the metal molds may be any or a combination of the aforementioned sacrificial, semi-permanent, or permanent releases. However, the other surface which requires release is the interface between the bladder and the green tire. This is difficult because the release material must selectively adhere to one rubber surface and release from the other rubber surface.

Typically, the bladder/tire release material is painted or sprayed on to the inside of the green tires. The green tires must then sit and wait for the release material to dry and cure, which limits the rate of tire production. Release is usually not applied to the bladder because of the possibility of contaminating the metal mold surface.

One solution to this limiting step in tire manufacturing is to use a semi-permanent coating on the bladder. Prior art semi-permanent compositions are deficient because the release agents are often solvent based, thus creating volatile organic compounds (VOC) which have environmental and regulatory issues. Additionally, most of these prior art compositions evolve hydrogen gas during storage and use, presenting a fire and explosion hazard.

Thus, there remains an unmet need to have a water-based release agent that is VOC-free; that can be used in a semi-permanent fashion, thus reducing the number of applications, and that does not use hydrides, thus eliminating the production of hazardous hydrogen gas. In addition, there remains an unmet need for a release agent having the characteristics above that can be easily applied and rapidly cure to a green tire or bladder and provide multiple releases.

SUMMARY OF THE INVENTION

A release agent is provided exhibiting some or all of the properties of environmental compatibility, cure times suitable for the end molder's process, excellent release ease, excellent cosmetics, lack of injurious transfer, and excellent longevity. In one embodiment, the inventive release agent is formed utilizing a modified polyorganosiloxane that contains a minimum of three reactive moieties per molecule to provide for both mold adhesion and crosslink density.

In at least one embodiment, an inventive mold release composition is used which contains at least one modified reactive polyorganosiloxane. The modified reactive polyorganosiloxane contains both a reactive moiety and a non-reactive moiety. The reactive moiety is believed to be associated with coating hardness and adhesion to the substrate while the non-reactive moiety is believed to be associated with coating flexibility and release from the molded article. As a result, a polyorganosiloxane containing both reactive and non-reactive moieties affords a desirable set of performance properties to an inventive mold release agent. In at least one embodiment, the inventive composition optionally includes at least one additional release mechanism, at least one emulsifier suitable for producing an emulsion of said reactive polyorganosiloxane, at least one emulsifier suitable for producing an emulsion of said release mechanism, water, catalysts, antimicrobial agents, fillers, pigments, wetting agents, cross-linking agents, additives, or combinations thereof. In at least one embodiment the reactive moieties are dependent on the side chain of the polymer and not dependent on one or both terminal ends.

An inventive polyorganosiloxane has the formula of formula (I):

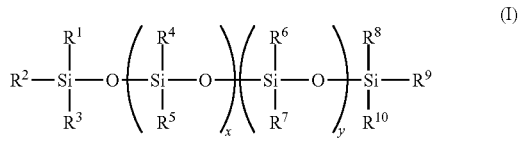

where y≥3 and x is ≥0. A reactive moiety for the purposes of the present invention include those moieties that react on the mold surface or bladder surface to form bonds to other polymers of Formula (I), the mold surface, or both. Reactive moieties $R^4$, $R^5$, $R^6$, and $R^7$ operative herein can be the same or different, and each is independently, but not limited to, a glycydoxy, $C_1$-$C_8$ alkoxy, $C_1$-$C_8$ alkoxy having a substituent, a halogen of fluorine or chlorine, a $C_1$-$C_8$ haloalkyl, a primary or secondary amine where each group is $C_0$-$C_8$, an isocyanate, a ureido, a $C_2$-$C_8$ or greater linear hydrocarbon comprising at least one ethylenic unsaturation, a $C_2$-$C_8$ or greater hydrocarbon including at least one ethylenic unsaturation and having a substituent, an acrylic, an allyl alcohol, hydroxyl group, methylacryloxy, acryloxy, mercapto, vinyl, styryl, chlropropyl, and/or sulfido. A substituent for $R^4$, $R^5$'$R^6$, or $R^7$ may include fluorine in place of hydrogen, perfluorinated forms thereof, a sulfonyl, or other suitable substituents. In contrast, non-reactive moieties in a molecule of formula (I) illustratively include where $R^1R^2$, $R^3$, $R^8$, $R^9$, and $R^{10}$ can be the same or different and each independently is a saturated $C_1$-$C_8$ or greater alkyl, either linear or branched. It is appreciated that $R^4$, $R^5$, $R^6$, and $R^7$ can also each independently be a saturated $C_1$-$C_8$ or greater alkyl, either linear or branched with the proviso that at least three reactive moieties are present in Formula (I) for $R^4$, $R^5$, $R^6$, and $R^7$ and further that any hydrogen present in the R groups is non-labile so as to preclude the outgassing of hydrogen.

Additionally, although an inventive mold release polymer can be made from two different co-monomers as shown, it is appreciated that there can be any number of co-monomers that can be used to make the polymer.

DETAILED DESCRIPTION OF THE PREFERRED EMBODIMENTS

The following detailed description is merely exemplary in nature and is in no way intended to limit the scope of the invention, its application, or uses, which may vary. The invention is described with relation to the non-limiting definitions and terminology included herein. These definitions and terminology are not designed to function as a limitation on the scope or practice of the invention, but are presented for illustrative and descriptive purposes only.

In at least one embodiment, the composition has the formula of formula 1:

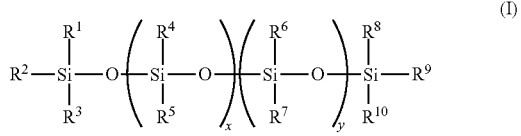

where y≥3 and x is ≥0. A reactive moiety for the purposes of the present invention include those moieties that react on the mold surface or bladder surface to form bonds to other polymers of Formula (I), the mold surface, or both. Reactive moieties $R^4$, $R^5$, $R^6$, & $R^7$ operative herein can be the same or different, and each is independently, but not limited to, a glycydoxy, $C_1$-$C_8$ alkoxy, $C_1$-$C_8$ alkoxy having a substituent, a halogen of fluorine or chlorine, a $C_1$-$C_8$ haloalkyl, a primary or secondary amine where each group is $C_0$-$C_8$, an isocyanate, a ureido, a $C_2$-$C_8$ or greater linear hydrocarbon comprising at least one ethylenic unsaturation and having a substituent, an acrylic, an allyl alcohol, hydroxyl group, methylacryloxy, acryloxy, mercapto, vinyl, styryl, chlropropyl, and/or sulfido. A substituent for $R^4$, $R^5$'$R^6$, or $R^7$ may include fluorine in place of hydrogen, perfluorinated forms thereof, a sulfonyl, or other suitable substituents. In contrast, non-reactive moieties in a molecule of formula (I) illustratively include where $R^1$ $R^2$, $R^3$, $R^8$, $R^9$, and $R^{10}$ can be the same or different and each independently is a saturated $C_1$-$C_8$ or greater alkyl, either linear or branched. It is appreciated that $R^4$, $R^5$, $R^6$, and $R^7$ can also each independently be a saturated $C_1$-$C_8$ or greater alkyl, either linear or branched with the proviso that at least three reactive moieties are present in Formula (I) for $R^4$, $R^5$, $R^6$, and $R^7$ and further that any hydrogen present in the R groups is non-labile so as to preclude the outgassing of hydrogen.

Additionally, although an inventive mold release polymer can be made from two different co-monomers are shown, it is appreciated that there can be any number of co-monomers that can be used to make the polymer.

In at least one embodiment, a release agent is provided. The release agent includes at least one reactive, modified polysiloxane. In at least one embodiment, the release agent further includes at least one modified reactive siloxane, a modified non reactive siloxane, or a combination thereof. It is appreciated that an inventive mold release in some applications functions a semi-permanent mold release. Semi-permanent in the context of the present invention is intended to define coatings applied to a mold surface which provides for more than one release per application.

In at least one embodiment of the present invention, a water-based release agent includes an emulsifier or blend of emulsifiers. In at least one embodiment of the present invention, a water-based release agent additionally includes one or more of a catalyst, a thickening agent, a wetting (or re-wetting agent), a filler, a pigmenting agent, an antimicrobial agent, or combinations thereof.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

As used herein, a $C_0$ moiety denotes the moiety absent a carbon chain; by way of example, a hydroxyl $C_0$ alkyl denotes a hydroxyl directly bonded to the remainder of the molecule.

The materials that are used in multiple molding cycle release agents are myriad in number and are apparent to those of ordinary skill in the art. With no intent of limitation and as stated previously, materials which can be utilized to produce release agents described herein include, oils, fatty acids, metal salts of fatty acids, "waxes", silicon based polymers, silanes, fluoropolymeric polymers, glycols and a myriad of combinations of the above. It is appreciated that these conventional materials are readily used in conjunction with an inventive mold release agent as sequential or layers on a substrate or as a formulation therewith.

An inventive mold release must provide for both adherence of the release agent to the mold (via one or more adhesion mechanisms), and provide for non-adherence of the molding article to the mold release interface in order to function as a semi-permanent mold release agent.

Formulation requirements are varied and in general are based upon the mold composition, the "aggressive nature" of the molding medium (to solvate and/or abrade the mold release interface), the requirement (or lack thereof) for release ease and/or mechanical "slip", which is often dictated by the geometry of the molded article.

In at least one embodiment, the inventive release agent contains one or more reactive, polymers which serve as both adhesion mechanisms to the mold substrate as well as a release mechanism for the molding medium according to Formula (I).

In at least one embodiment of the present invention, the reactive polymer does not contain reactive moieties at the terminal ends of the polymer. In at least one embodiment of the present invention, the reactive polymer contains at least three reactive moieties per molecule. In still another embodiment of the present invention, the reactive polymer does not contain reactive moieties at the terminal ends of the polymer and contains at least three reactive moieties per molecule. In some embodiments of the present invention, the polymer of formula (I) has 4, 5, 6, and up to 20 or more reactive moieties with the appreciation that a molecular weight per reactive moieties value is readily varied with a lower molecular weight per reactive moiety typically associated with a harder coating having better mold surface bonding properties, as compared to a higher molecular weight per reactive moiety. In some embodiments of the present invention, the polymer of formula (I) has pendant reactive moieties. In still other inventive embodiments, the polymer of formula (I) has all of said reactive moieties being like moieties; which for example are all glycidyl moieties. Without intending to be bound by a particular theory of operation, it is believed that pendant reactive moieties bond to the surface of the mold or bladder and within the semi-permanent mold release layer.

In at least one embodiment, the compositions or agents of this invention can also contain one or more release mechanisms, catalysts, fillers, pigments, wetting agents, re-wetting agents, other additives (with no intention of placing any limitation) such as gas scavengers, fluorescing agents. Water-based systems may contain any and all of the above and may also include emulsifiers and anti-microbial agents.

Formation of such novel reactive polymers can be performed utilizing a variety of polymerizing processes.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments.

The invention claimed is:

1. A mold release coating on a mold surface, the mold release coating being derived from a polysiloxane having the formula of formula 1:

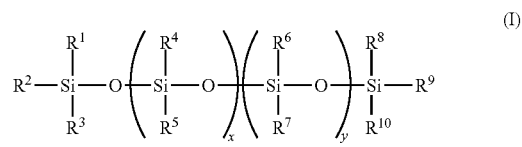

where y≥3 and x is ≥0, where a reactive moiety for the purposes of the present invention include those moieties that react on the mold surface to form bonds to other polymers of Formula (I), the mold surface, or both, where reactive moieties comprise one or more of $R^4$, $R^5$, $R^6$, or $R^7$, where $R^4$, $R^5$, $R^6$, or $R^7$ are the same or different and each is independently one or more of reactive moieties of glycydoxy, $C_1$-$C_8$ alkoxy, $C_1$-$C_8$ alkoxy having a substituent, or independently one or more of unreactive moieties $C_1$-$C_8$ or longer alkyl, either branched or unbranched; and where $R^1$ $R^2$, $R^3$, $R^8$, $R^9$, and $R^{10}$ can be the same or different and each independently is a saturated $C_1$-$C_8$ or greater alkyl, either linear or branched with the proviso any hydrogen present in the R groups is non-labile; and the mold surface being an inflatable elastomeric bladder surface, the polysiloxane bonded to the rubber bladder surface by reaction of the one or more reactive moieties.

2. The coating of claim 1 wherein said reactive moieties include at least three reactive moieties.

3. The coating of claim 1 wherein said reactive moieties are all pendant.

4. The coating of claim 1 wherein all of said reactive moieties are like moieties.

\* \* \* \* \*